(12) United States Patent
Maloberti et al.

(10) Patent No.: US 9,404,604 B2
(45) Date of Patent: Aug. 2, 2016

(54) DEVICE FOR LAYING A PIPE IN AN EXPANSE OF WATER, AND RELATED STRUCTURE AND METHOD

(75) Inventors: René Maloberti, Champigny sur Marne (FR); Sébastien Legeay, Le Trait (FR); Didier Bonnemaison, Collegien (FR); Yannick Thibault, Duclair (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 13/977,960

(22) PCT Filed: Jan. 3, 2012

(86) PCT No.: PCT/EP2012/050057
§ 371 (c)(1),
(2), (4) Date: Aug. 2, 2013

(87) PCT Pub. No.: WO2012/093122
PCT Pub. Date: Jul. 12, 2012

(65) Prior Publication Data
US 2014/0010595 A1    Jan. 9, 2014

(30) Foreign Application Priority Data
Jan. 4, 2011    (FR) ...................................... 11 50045

(51) Int. Cl.
*F16L 1/19*    (2006.01)
*F16L 1/15*    (2006.01)
(Continued)

(52) U.S. Cl.
CPC . *F16L 1/15* (2013.01); *B66C 13/08* (2013.01); *B66C 23/16* (2013.01); *B66C 23/52* (2013.01); *F16L 1/19* (2013.01); *F16L 1/203* (2013.01)

(58) Field of Classification Search
CPC .................. F16L 1/15; F16L 1/19; F16L 1/23
USPC ................. 405/166, 168.1, 168.4; 414/745.4, 414/22.64
See application file for complete search history.

(56) References Cited

U.S. PATENT DOCUMENTS 4,486,123 A * 12/1984 Koch et al. .................... 405/169
7,581,904 B2 * 9/2009 Bursaux et al. ............... 405/166
(Continued)

FOREIGN PATENT DOCUMENTS

EP    2 005 050    6/2010
WO    WO 03/060366 A2    7/2003
(Continued)

OTHER PUBLICATIONS

International Search Report dated Mar. 27, 2012 issued in corresponding International patent application No. PCT/EP2012/050057.

*Primary Examiner* — Thomas B Will
*Assistant Examiner* — Katherine Chu
(74) *Attorney, Agent, or Firm* — Ostrolenk Faber LLP

(57) ABSTRACT

A device for laying a pipe in an expanse of water includes a tower (30) intended to protrude along a tower axis (B-B') in a floating laying structure (10), and assemblies (34A, 34B) for gripping and moving the pipe (12) in order to guide the movement of the pipe (12) towards the expanse of water (11) along a laying axis (C-C'). Each gripping and moving assembly (34A, 34B) is borne by the tower (30). The tower (30) is formed by a barrel (32) extending along the tower axis (B-B'), each gripping assembly transversely protruding from the barrel (32) relative to the tower axis (B-B').

24 Claims, 9 Drawing Sheets

(51) Int. Cl.
*F16L 1/20* (2006.01)
*B66C 13/08* (2006.01)
*B66C 23/16* (2006.01)
*B66C 23/52* (2006.01)

(56) References Cited

U.S. PATENT DOCUMENTS 7,938,598 B2 * 5/2011 Roodenburg et al. ...... 405/168.4
8,240,954 B2 * 8/2012 Roodenburg et al. ...... 405/168.4
2005/0036842 A1 * 2/2005 Stockstill .................... 405/168.3
2005/0047872 A1 * 3/2005 Baugh .......................... 405/158
2011/0033243 A1 * 2/2011 Roodenburg et al. ...... 405/168.4
2012/0128432 A1 * 5/2012 Noble et al. .................. 405/196

FOREIGN PATENT DOCUMENTS

| WO | WO 2004/040182 A1 | 5/2004 |
| WO | WO 2005/095835 A1 | 10/2005 |
| WO | WO 2009/134116 A1 | 11/2009 |

* cited by examiner

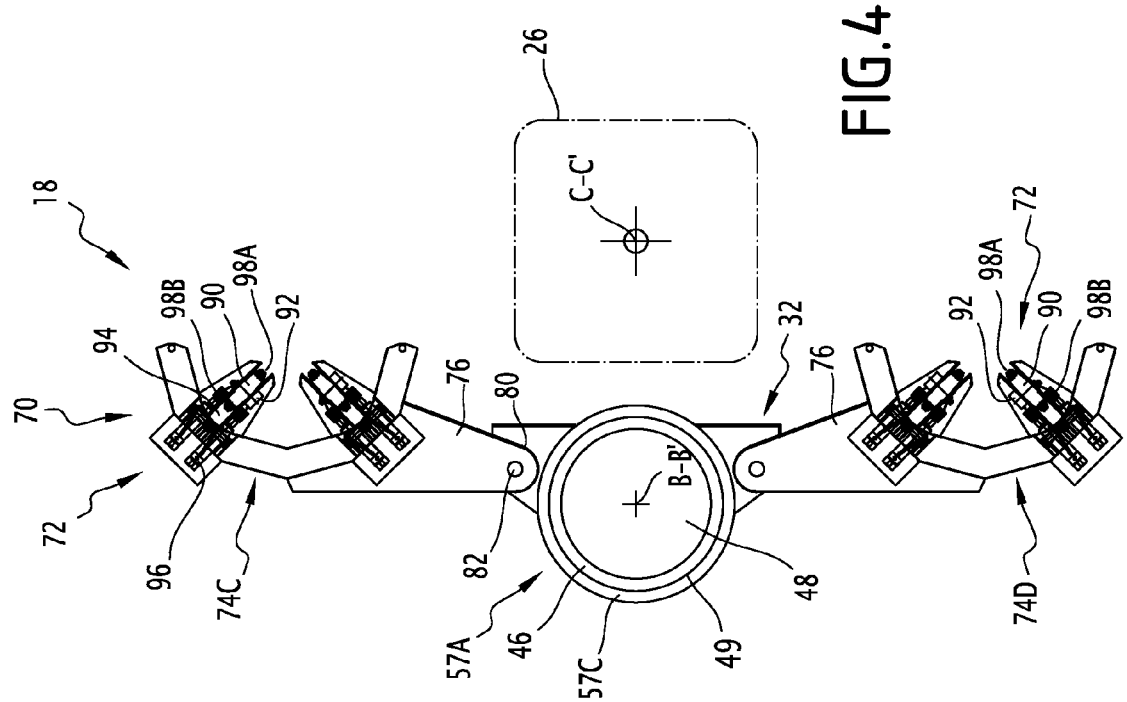
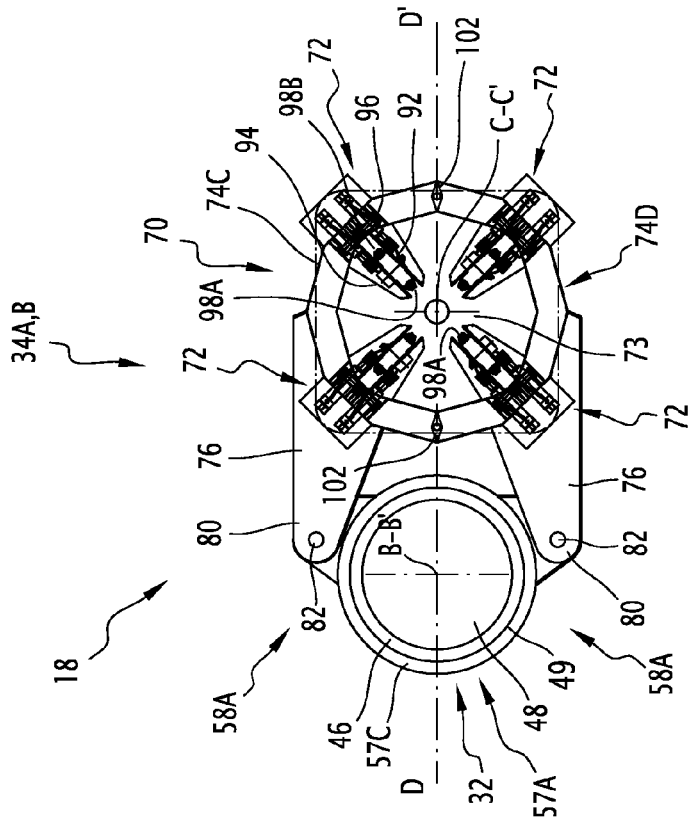

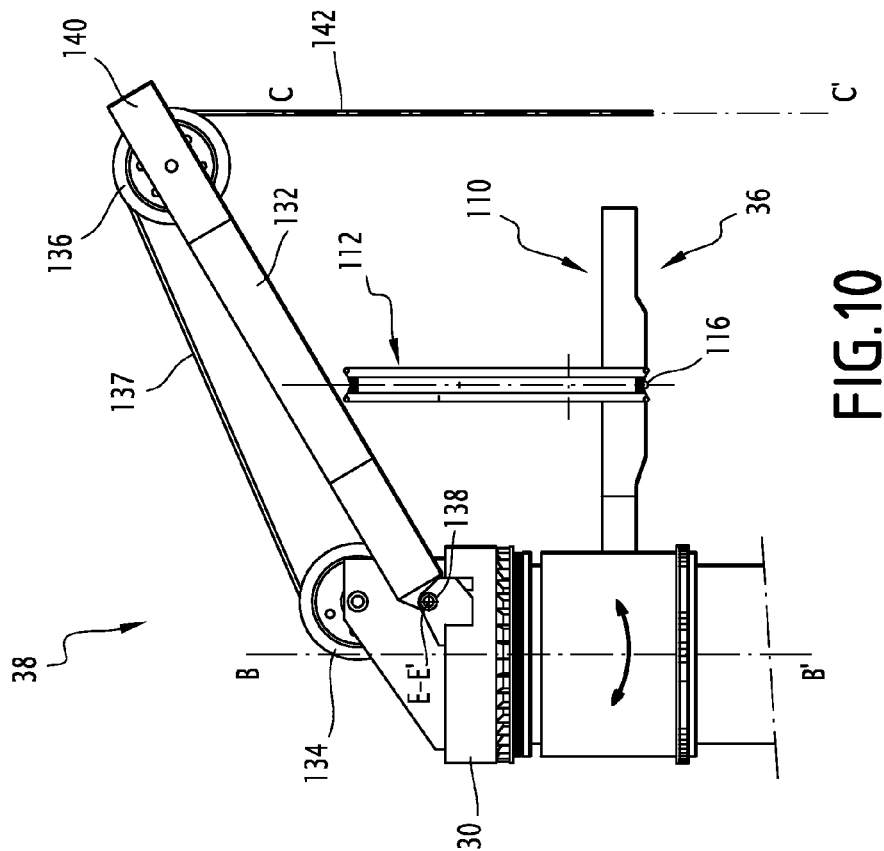
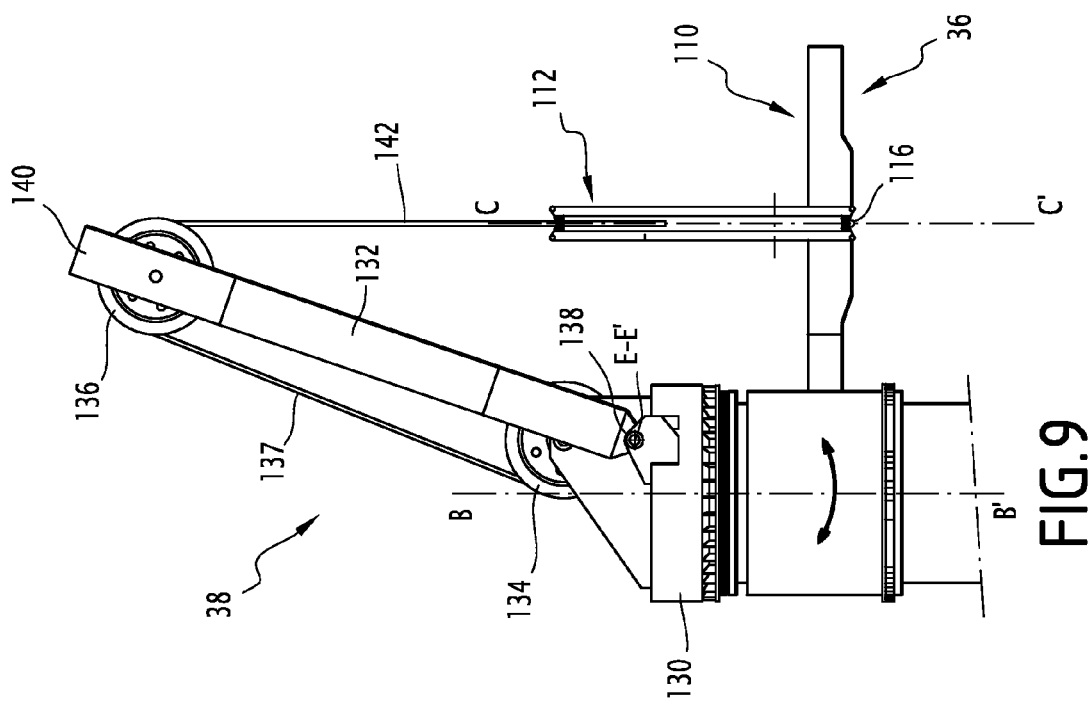
FIG. 9
FIG. 10

DEVICE FOR LAYING A PIPE IN AN EXPANSE OF WATER, AND RELATED STRUCTURE AND METHOD

CROSS REFERENCE TO RELATED APPLICATIONS

The present application is a 35 U.S.C. §371 National Phase conversion of PCT/EP2012/050057, filed Jan. 3, 2012, which claims benefit of French Application No. 11 50045, filed Jan. 4, 2011, the disclosure of which is incorporated herein by reference. The PCT International Application was published in the French language.

BACKGROUND OF THE INVENTION

The present invention relates to a device for laying a pipe, advantageously a fluid transport pipe, in an expanse of water, of the type comprising:

a tower intended to protrude along a tower axis in a floating laying structure;

at least one assembly for gripping and moving the pipe intended to come into contact with a peripheral surface of the pipe in order to guide the movement of the pipe towards the expanse of water along a laying axis substantially parallel to the tower axis, said or each gripping and moving assembly being borne by the tower.

The pipe is notably intended for transporting hydrocarbons collected in the bottom of the expanse of water up to the surface of the expanse of water.

The pipe is in particular a flexible pipe stored in a floating structure and deployed in the expanse of water via the laying device. Alternatively, the pipe is a rigid pipe deployed or mounted from the laying structure.

In all the following, a flexible pipe is notably a pipe as described in the normative documents published by the 'American Petroleum Institute (API), API 17J, and API RP17B, well known to one skilled in the art.

This definition equally encompasses flexible pipes of the unbonded or bonded type.

More generally and alternatively, the flexible pipe is a composite manifold of the « bundle» type comprising at least one fluid transport tube and an assembly of electric or optical cables capable of conveying electric or hydraulic power or information between the bottom and the surface of the expanse of water.

Still alternatively, the pipe is an umbilical described in the normative documents of the American Petroleum Institute (API) API 7E.

In order to deploy such pipes, it is known how to unwind them from storage means present on the ship. The storage means are notably a rotary basket or drum.

A laying device of the aforementioned type is for example described in EP 2 005 050.

The pipe is unwound from storage means but is generally pulled up on a chute borne by the tower of the laying device.

Then, the pipe is engaged in gripping and moving assemblies comprising tensioners with caterpillar-type tracks. The pipe thus extends down vertically or in a tilted way along the tower before plunging into the expanse of water.

The pipe is retained by tensioning means which ensure its suspension in the expanse of water. Further, the tensioning means support the mechanical tension from the weight of the unwound pipe and avoid that the storage means be subject to this weight, while guaranteeing that the pipe does not undergo flexure which goes beyond its minimum flexural radius of curvature without any damage (Minimal Bending Radius (MBR)).

In order to plunge the pipe into the expanse of water, a vertical well is generally made through the hull of the ship in order to form a passage for lowering the pipe. Such a well is designated by the term of « moon pool» .

More generally, the tower of the laying device extends vertically or in a tilted way in the vicinity of this well in order to alloy deployment of the pipe through the passage.

In EP 2 005 050, the tower is formed by an openworked trellis supporting the assemblies for gripping and moving the pipe.

Such a laying device does not give entire satisfaction since it is limited in terms of accessibility and adaptability to different working environments.

Indeed, this device is relatively bulky on the deck of the laying structure. It is therefore not possible to clear substantial space on the deck when this is necessary, for example for storing or laying elements having great bulkiness.

In certain cases, it may be more adequate to lay the pipe by passing over a side edge of the structure and not especially through a central well made in the hull.

An object of the invention is therefore to obtain a device for laying a pipe in an expanse of water which has great robustness, while having a large variety of configurations of use, in order to notably allow clearing of space on the deck of the ship when this is required, or the laying of pipes by passing over a side edge of the laying structure.

SUMMARY OF THE INVENTION

For this purpose, the object of the invention is a device of the aforementioned type, characterized in that the tower is formed by a barrel extending along the tower axis, said or each gripping and moving assembly protruding transversely from the barrel relatively to the tower axis.

The device according to the invention may comprise one or several of the following features, taken individually or according to any technically possible combination:

the barrel has a substantially solid peripheral surface;

the chute is mounted so as to rotate around the tower axis relatively to the barrel;

the barrel includes a single attachment leg in the floating structure, the barrel advantageously having a solid peripheral surface;

said or each gripping and moving assembly is angularly moveable around the tower axis between a first laying configuration and a second laying configuration;

said or each gripping and moving assembly is rotatably mounted relatively to the barrel in order to move said or each gripping and moving assembly between its first laying configuration and its second laying configuration;

the device includes a support intended to be attached on the floating laying structure, the barrel being rotatably mounted in the support around the tower axis in order to move said or each gripping and moving assembly between its first laying configuration and its second laying configuration;

it includes a chute for guiding the pipe toward said or each gripping and moving assembly, the guiding chute being borne by the tower, while being advantageously arranged above said or each gripping and moving assembly;

it includes a handling device distinct from said or each gripping and moving assembly, the handling device being borne by the tower;

the handling device is mounted at an upper end of the barrel.

the handling device is rotatably mounted relatively to the barrel.

the handling device comprises a winch and a line which may be deployed from the winch, the deployable line being able to bear the pipe.

said or each gripping and moving assembly includes a chassis defining a passage for circulation of the pipe along a laying axis parallel to the tower axis, and at least one mechanism for gripping a peripheral surface of the pipe, the gripping mechanism being borne by the chassis;

the chassis is moveable between a closed laying configuration and an open configuration for accessing the circulation passage, the chassis advantageously comprising two opposite supporting structures, each supporting structure bearing a gripping mechanism intended to come into contact with the pipe, at least one supporting structure, advantageously both supporting structures, being mounted so as to be able to rotate relatively to the barrel in order to have the chassis pass from its closed configuration to its open configuration;

the gripping mechanism comprises a tensioner with caterpillar-type tracks.

The object of the invention is also a floating laying structure intended for laying a conduit in an expanse of water, of the type comprising:

a deck;

a laying device as defined above, the laying device protruding onto the deck,

Said or each gripping and moving assembly being advantageously moveable relatively to the deck between a first laying configuration, in which the laying axis is positioned facing the deck, notably facing a central well made in the structure, and a second laying configuration in which the laying axis is located outside the deck.

The laying structure according to the invention may comprise the following feature:

it bears a pipe, advantageously a flexible pipe, engaged into said or each gripping and moving assembly.

The object of the invention is also a method for laying a pipe in an expanse of water, the method being of the type comprising the following steps:

positioning a structure as defined above at the surface of the expanse of water facing a region for laying the pipe;

placing said or each assembly for gripping and moving the pipe in a laying configuration;

engaging at least one section of the pipe to be laid into said or each gripping and moving assembly;

vertically moving the pipe with the gripping and moving assembly in order to deploy the pipe in the expanse of water.

BRIEF DESCRIPTION OF THE DRAWINGS

The invention will be better understood upon reading the description which follows, only given as an example, and made with reference to the appended drawings, wherein:

FIG. 3 is a partial sectional view along the plane III of FIG. 1 in a closed configuration of the assembly for gripping and moving the pipe;

FIG. 4 is a view similar to FIG. 3, in an open configuration of the assembly for gripping and moving the pipe;

FIG. 9 is a schematic view of the handling device in a first configuration of use for leaving a flexible pipe on the bottom of the expanse of water;

FIG. 10 is a view similar to FIG. 9 in a second configuration of use in which the handling device is used as a lifting crane on the ship;

DESCRIPTION OF PREFERRED EMBODIMENTS

A first floating laying structure 10 according to the invention is illustrated in FIGS. 1 to 10.

The structure 10 floats on an expanse of water 11 (visible in FIG. 2) which for example is a sea, an ocean or a lake. The depth of the expanse of water 11 between the surface 11A and the bottom is greater than 5 meters and notably comprised between 100 meters and 4,000 meters.

The laying structure 10 is intended for laying a pipe 12 which advantageously is a flexible pipe.

The flexible pipe is notably a pipe as described in the normative documents published by the American Petroleum Institute (API), API 17J, and API RP17B. The pipe is alternatively an umbilical as described in the normative documents published by the American Petroleum Institute (API), API17E or else further an unwound rigid pipe.

This definition equally encompasses the flexible pipes of the unbonded or bonded type.

More generally, and alternatively, the flexible pipe is a composite manifold of the « bundle» type comprising at least one fluid transport tube and an assembly of electric or optical cables capable of conveying electric or hydraulic power or information between the bottom and the surface of the expanse of water.

The pipe 12 may bear pieces of equipment, such as connectors or bottom equipment which have a larger transverse extent than its average transverse extent.

Figure 1:
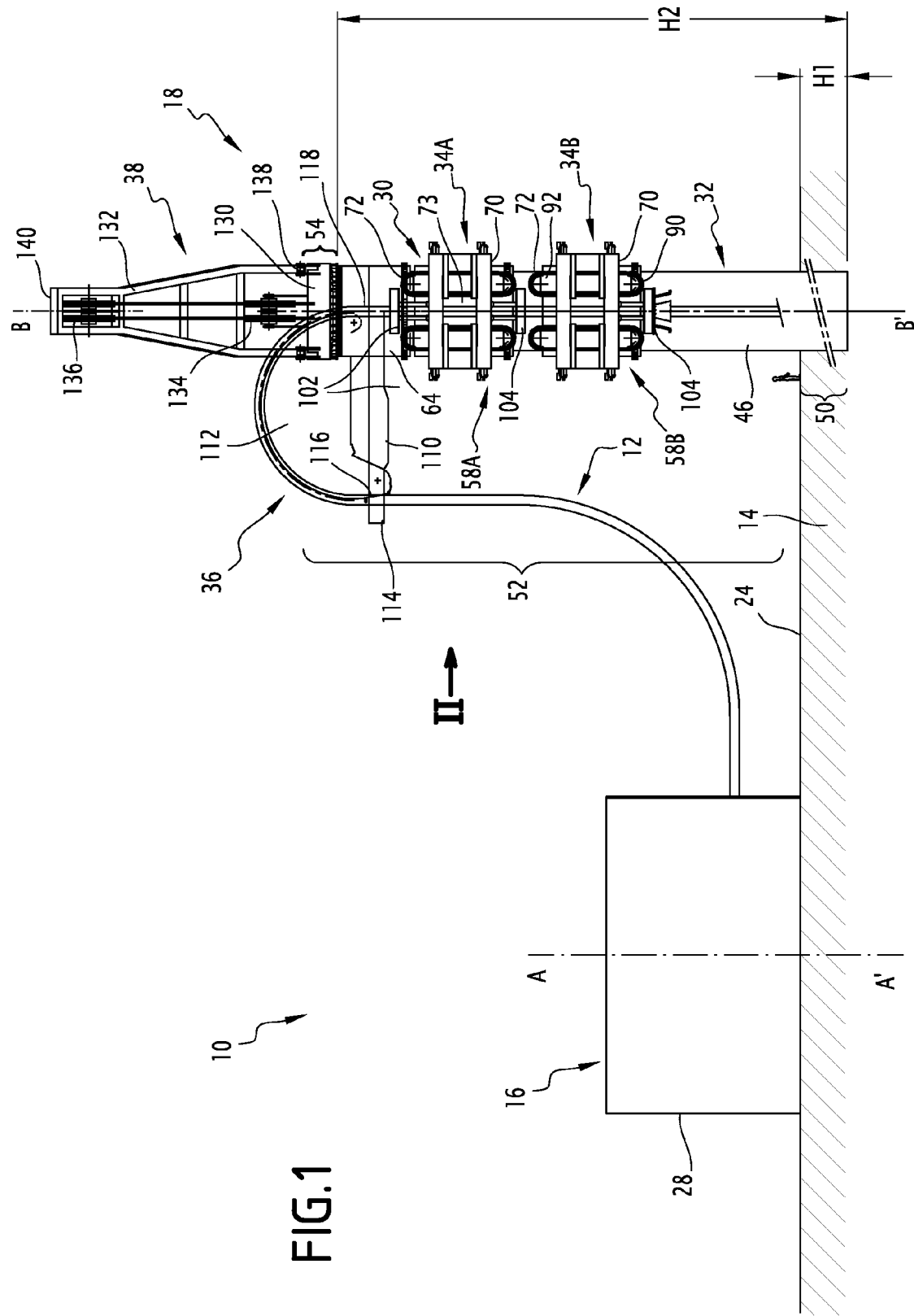
FIG. 1 is a partial side view of a first floating laying structure comprising a laying device according to the invention.

With reference to FIG. 1, the laying structure 10 includes a floating hull 14 on the extent of water 11, an assembly 16 for storing the pipe 12 on the hull 14 and a laying device 18 according to the invention, mounted on the hull 14.

The hull 14 is for example the hull of al ship comprising propulsion means. Alternatively, the hull 14 is formed by a floating platform on the expanse of water 11, a barge or a semi-submersible barge.

The hull 14 extends between a lower surface 22 immersed under the expanse of water 11 and an upper deck 24, from which the laying device 18 protrudes.

The deck 24 is advantageously located above the surface 11A of the expanse of water 11. In this example, the hull 14 interiorly delimits between the lower surface 22 and the upper surface 24, a central through-well 26, visible in FIGS. 2 and 3.

The well 26 is intended for laying the pipe 12 in a first laying configuration.

The central well 26 extends vertically. It opens upwards onto the deck 24 and it opens downwards into the expanse of water 11 through the lower surface 22.

In this example, the central well 26 is substantially located on the longitudinal axis of the ship.

When the pipe 12 is a flexible pipe, the storage assembly 16 is formed by a rotary member 28 for storing the pipe in a wound configuration. The rotary member 28 is for example a drum or a basket.

The storage assembly 16 is positioned on the deck 24 or in the hull 14.

The rotation of the storage member 28 in a first direction around its axis A-A' gives the possibility of unwinding an increasing length of pipe 12 towards the laying device 18, while rotation in a second direction opposite to the first direction gives the possibility of winding an increasing length of pipe onto the storage member 28.

According to the invention, the laying device 18 includes a tower 30 formed with a single barrel 32 or « mono-barrel » of vertical axis B-B', defining a tower axis, and at least one assembly 34A, 34B for gripping and moving the pipe 12, borne by the tower 30.

The laying device 18 further includes an assembly 36 for guiding the movement of the pipe 12 between the storage assembly 16 and said or each gripping and moving assembly 34A, 34B. The device 18 further includes advantageously at least one device 38 for handling loads, borne by the tower 30, distinct from said or each gripping and moving assembly 34A, 34B.

As this was seen above, the tower 30 comprises a single vertical barrel 32 protruding from the deck 24 along its axis B-B'.

As illustrated by FIGS. 3 and 4, the barrel 32 is formed by a tubular wall 46 delimiting a hollow central space 48. The tubular wall 46 delimits a solid peripheral surface 49 which totally or substantially totally obturates the central space 48 outwards. Thus, for example more than 90% of the exposed outer surface of the barrel 32 is obturated by the surface 49.

In the example illustrated in FIGS. 1 to 8, the barrel 32 has a substantially cylindrical shape. It has a substantially circular cross-section.

The barrel 32 includes a single and continuous leg around the attachment axis B-B' on the deck of the ship, unlike the trellis structures of the prior art which have two attachment legs, commonly designated as an « A frame ».

The single-leg barrel 32 may have various shapes, for example a tubular, conical shape or further a square base and a cylindrical upper portion.

As illustrated by FIG. 1, the barrel 32, includes a lower portion 50 engaged into the hull 14, forming the single leg of the barrel 32, an intermediate portion 52 bearing said or each gripping and moving assembly 34A, 34B and an upper portion 54 on which is mounted the handling device 38.

In this example, the barrel 32 is fixedly mounted in rotation in the hull 14 for example by fitting it in. Alternatively, the mechanical fitting of the barrel may be achieved by increasing the stiffness or by any other means known to one skilled in the art.

The intermediate portion 52 includes for at least one gripping and moving assembly 34A, 34B, a sleeve 57A, 57B for pivoting each gripping and moving assembly 34A, 34B, each sleeve 57A, 57B advantageously bearing a side support 58A, 58B located on either side of the axis B-B' at a given height above the deck 24.

Each pivoting sleeve 57A, 57B includes a ring engaged around the outer surface of the barrel 32. The ring 57C is translationally retained along the axis B-B' of the barrel 32 against its weight by a lower abutment 57D.

Thus, the sleeve 57A, 57B is displaceable in rotation around the axis B-B' relatively to the barrel 32 in order to move the gripping and moving assembly 34A, 34B which it bears in rotation around the axis B-B', at least between a first laying configuration and a second laying configuration, which will be described in detail below.

Each support 58A, 58B includes in this example, a central protrusion 60 and two retaining and guiding plates 62A, 62B located above and below the protrusion 60, respectively.

As each support 58A, 58B is mounted on a sleeve 57A, 57B, it is displaceable in rotation around the axis B-B' together with the sleeve 57A, 57B.

The intermediate portion 52 further includes, above the sleeves 57A, 57B, an additional support 64 for retaining the guiding assembly 36.

Figure 2:
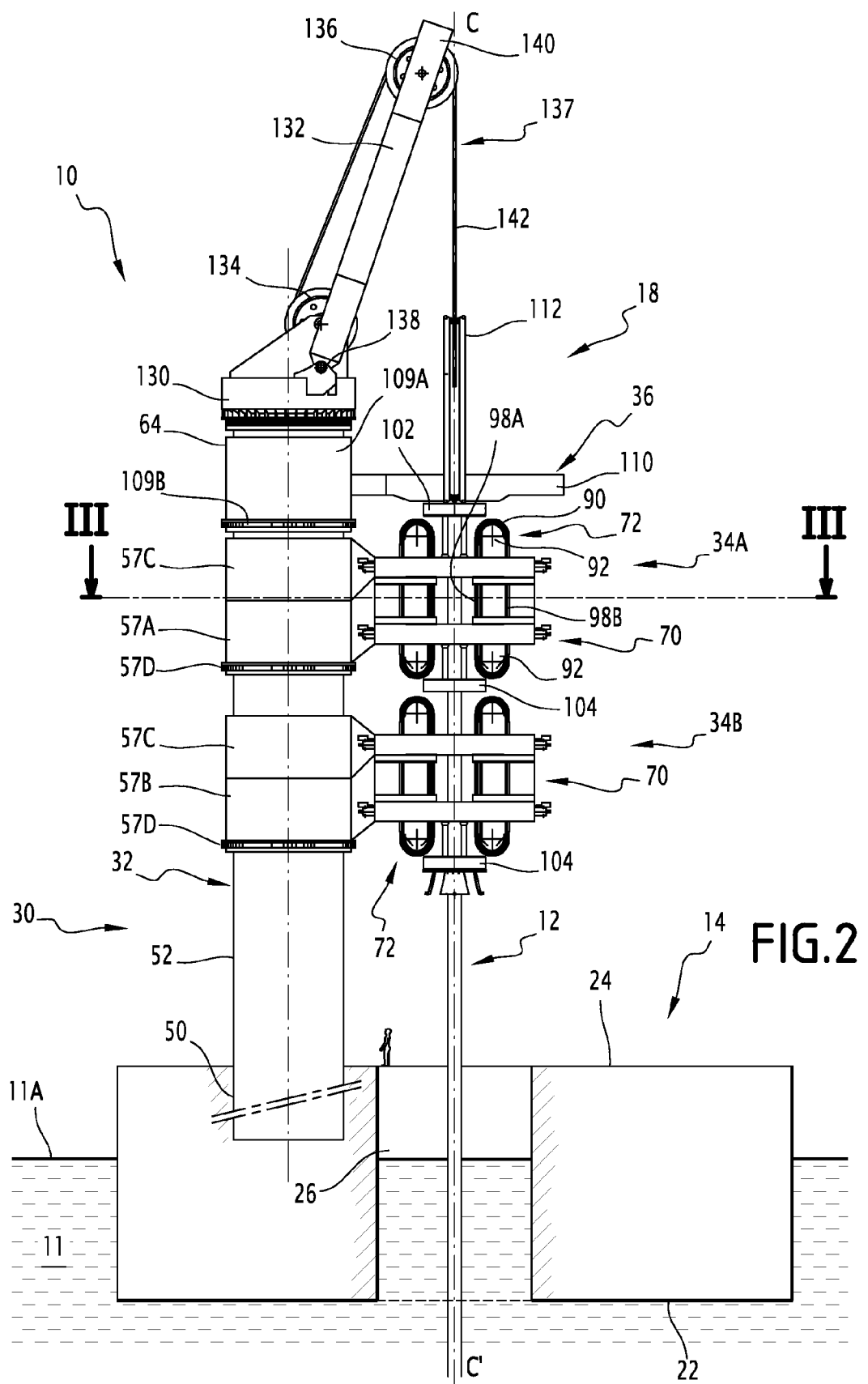
FIG. 2 is a side view of the structure of FIG. 1.

In the example illustrated in FIG. 2, the tower 30 bears two gripping and moving assemblies 34A, 34B longitudinally spaced out along the axis B-B'.

Each assembly 34A, 34B includes a supporting chassis 70 and at least two gripping mechanisms. The gripping mechanisms are tensioners with caterpillar-type tracks 72 borne by the chassis 70.

As this will be seen below, each chassis 70 may be displaced between an open configuration and a closed configuration of use, which will be described below.

In the closed configuration, each chassis 70 delimits a central passage 73 extending vertically along an axis C-C' defining an axis for laying the pipe 12. This laying axis C-C' is substantially parallel to the axis B-B' of the tower 30, i.e. totally parallel or tilted by an angle for example of less than 10° relatively to the B-B' axis.

With reference to FIGS. 3 and 4, each chassis 70 includes two rotary half-frames 74C, 74D. Each half-frame 74C, 74D is connected to a respective support 58A, 58B via a connecting arm 76.

In the example illustrated in FIGS. 3 and 4, each half-frame 74C, 74D has, projected in a horizontal plane, a U-shell shape opening towards the U-shell of the opposite half-frame 74D, 74C.

Each half-frame 74C, 74D advantageously bears two tensioners 72 positioned substantially perpendicularly to each other.

Each connecting arm 76 protrudes towards the barrel 32 from a rear surface of a half-frame 74C, 74D, as far as a free end 80 intended to be rotatably mounted in a support 58A, 58B via a pivot 82. The pivot 82 extends parallel to the axis B-B'.

In the example illustrated in the figures, each half-frame 74C, 74D is provided with two parallel arms 76 longitudinally shifted along the axis B-B'.

Each arm 76 is horizontally guided by a support 58A, 58B in order to maintain displacement of the arms 76 and of the half-frame 74C, 74D along a substantially horizontal plane, perpendicular to the axis of rotation defined by the pivot 82. Each end 80 of an arm 76 rests and is supported between a plate 62A and the protrusion 60.

Each tensioner 72 protrudes in the passage 73 towards the axis C-C'.

The tensioner 72 includes a guiding caterpillar track 90 intended to grip and move the pipe 12, two rollers 92, on which are wound the caterpillar track 90, a device 94 for driving the caterpillar track 90 along the axis B-B' and a mechanism 96 for radial displacement of each caterpillar track 90 towards the axis B-B'.

The caterpillar track 90 substantially has an endless band shape wound on two rollers 92. It thus has a longitudinal portion 98A for guiding the pipe and a return longitudinal portion 98B intended to extend parallel to the laying axis C-C'.

The guiding portion 98A is intended to come into contact with the outer peripheral surface of the pipe 12, along a generatrix.

The rollers 92 are moveable in rotation around an axis perpendicular to the axis C-C'. They are driven into rotation around their axis by the device 94, in order to cause displacement of the portions 98A, 98B parallel to the axis C-C'.

The radial displacement mechanism 96 for example includes at least one actuator capable of radially displacing each caterpillar track 90 away from the half-frame 74C, 74D towards the laying axis C-C', in order to apply a determined force on the outer peripheral surface of the pipe 12.

With reference to FIGS. 3 and 4, each chassis 70 is displaceable between an open configuration illustrated in FIG. 4 and a closed configuration illustrated in FIG. 3.

In the closed configuration illustrated in FIG. 3, the opposite half-frame 74C, 74D are positioned in contact with each other. They thus form a frame with a closed section delimiting the central passage 73, into which protrude the tensioners 72.

The passage 73 opens out upwards and downwards along the axis C-C'.

In this configuration, the arms 76 advantageously extend parallel to each other along an axis D-D' perpendicular to the C-C' axis.

The half-frames 74C, 74D are in contact with each other at their free ends 102. Retention means may be engaged between the half-frames 74C, 74D for maintaining them in a closed configuration.

In this configuration, each tensioner 72 of a half-frame 74C, 74D extends facing a tensioner 72 borne by an opposite half-frame 74D, 74C on either side of the laying axis C-C'.

Thus, the opposite guiding sections 98A of two tensioners 72 facing each other, face each other and are able to respectively grip two opposite angular sections of the pipe 12 relatively to the axis C-C'.

In the open configuration, each half-frame 74C, 74D was moved away from the opposite half-frame 74D, 74C by pivoting around the vertical pivot 80.

In the example illustrated in FIG. 4, the half-frames 74D, 74C were pivoted by at least 60°, advantageously by 90°, in order to clear the pace occupied by the half-frames 74C or 74D around the laying axis C-C' when the half-frames 74C, 74D are closed on each other. The chassis 70 is thus longitudinally open.

As this will be seen below, such a configuration allows the passage of objects of large sizes along the laying axis C-C' notably when such objects have to be moved down while being mounted on the pipe 12.

In an alternative illustrated in FIGS. 1 and 2, the chassis 70 of the assembly 34A further includes an upstream pre-guiding member 102 for the conduit 12, positioned above the caterpillar-tracks 90 coaxially with the axis C-C', and a downstream member 104 for guiding the outlet of the pipe 12 positioned coaxially with the axis C-C' above the caterpillar-tracks 90.

These members 102, 104 allow orientation of the pipe 12 when it passes between the caterpillar-tracks 90 of the tensioners 72.

A downstream guiding member 104 is mounted on the lower gripping and moving assembly 34B located just above the central well 26. This member 104 guarantees an adequate and centered radius of curvature for the outlet of the pipe 12 before its passing into the central well 26.

As this will be seen below, each gripping and moving assembly 34A, 34B may be angularly moved around the tower axis B-B' relatively to the deck 24, between a first laying configuration, illustrated in FIG. 5, wherein the laying axis C-C' is located facing the central well 26 and a second laying configuration, illustrated in FIG. 6, wherein the laying axis C-C' is located beyond the side edge of the laying structure 10. The angular displacement of each gripping and moving assembly 34A, 34B between its two laying configurations is greater than 90° and is notably equal to 180°.

Figure 7:
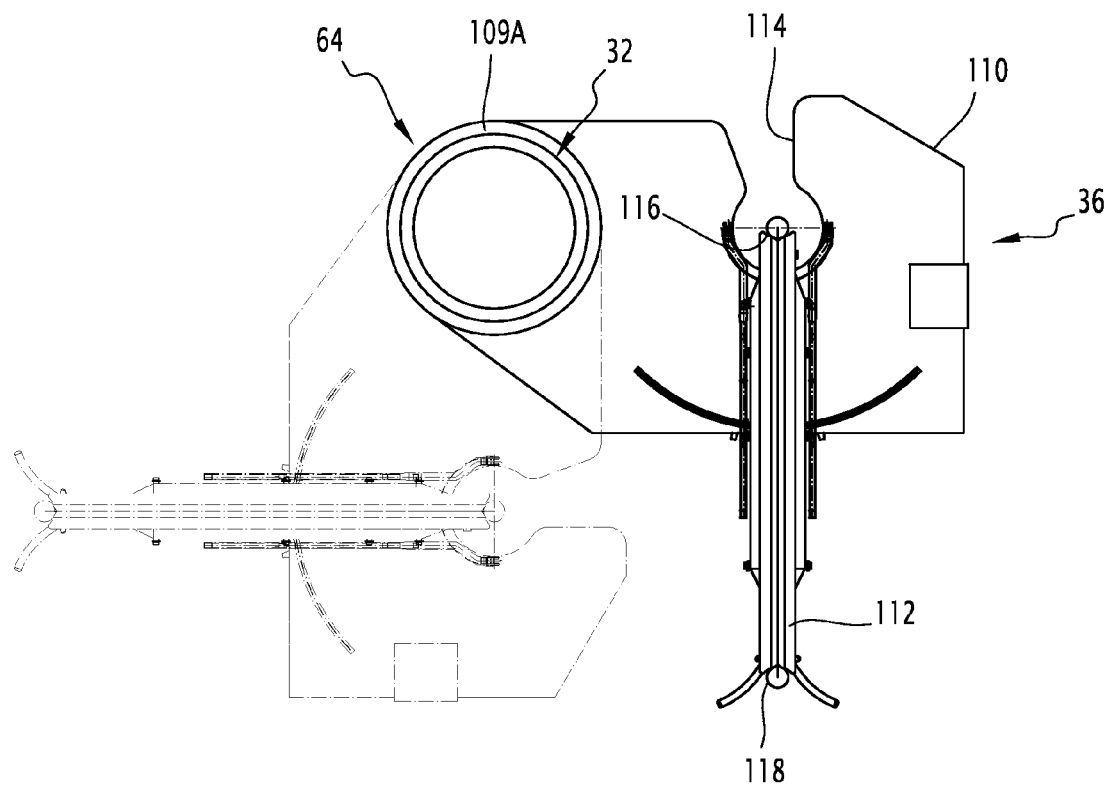
FIG. 7 is a top view of the assembly for guiding the laying device illustrated in FIG. 1.
Figure 8:
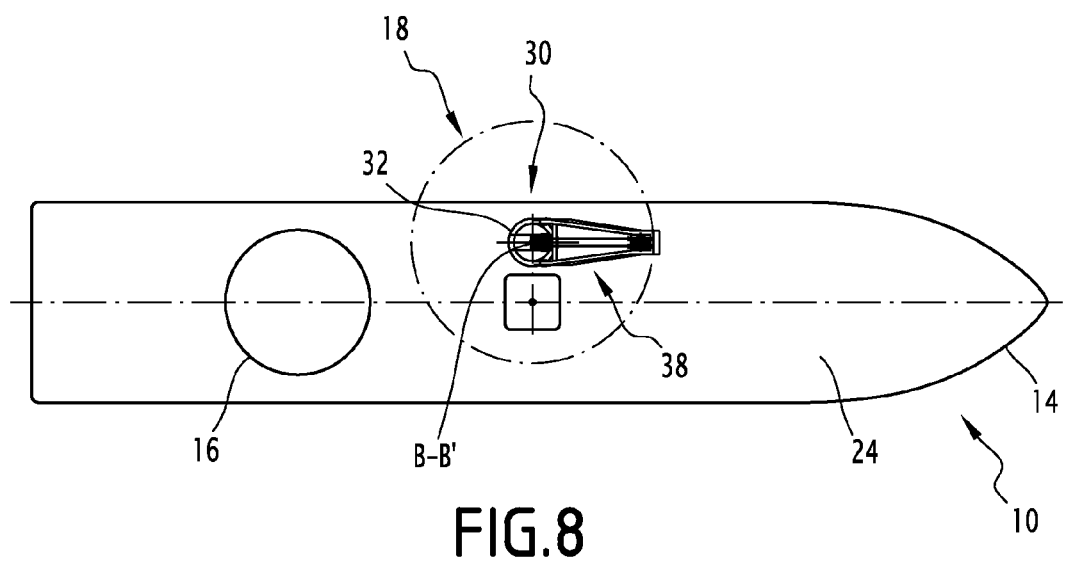
FIG. 8 is a top view of the device for handling the laying device illustrated in FIG. 1.

As illustrated by FIGS. 1 and 7, each additional support 64 is formed with a ring 109A pivotally mounted around the axis B-B' around the barrel 32.

Each ring 109A is translationally retained along the axis B-B' against its weight by an axial abutment 109B, visible in FIG. 1.

With reference to FIGS. 1 and 7, the guiding assembly 34 includes a rotary supporting plate 110 mounted on the additional support 64 and a guiding chute 112 borne by the plate 110.

The plate 110 is rotatably mounted together with the additional support around the axis B-B' in the vicinity of the other portion 54 of the tower 30, above 64 the assemblies 34A, 34B, via the retaining abutment 64.

The plate 110 in this example defines an upstream passage notch 114 of the pipe 12.

The chute 112 substantially has an U-shape turned downwards defining an adequate radius of curvature for the pipe 12. This radius of curvature is greater than the MBR of the pipe 12.

The chute 112 has an upstream end 116 positioned facing the notch 114 and a downstream end 118 intended to be placed facing the laying axis C-C', above a gripping and moving assembly 34A, 34B.

The chute 112 protrudes above the plate 110. Its free end 118 juts out away from the plate 110.

As illustrated by FIGS. 1, 2 and 8 to 10, the handling device 38 borne by the tower 30 includes a rotary base 130, a pivoting boom 132 mounted on the base 130, and return pulleys 134, 136 borne by the base 130 and by the boom 132 respectively.

The handling device 18 further comprises at least one winch (not visible) on which a deployment line 137 is wound.

As illustrated by FIGS. 9 and 10, the base 130 forms a cap rotatably mounted on the upper portion 54 of the barrel 32, around the axis B-B'.

The base 130 may thus be rotated around the axis B-B' over at least 360°. The base 130 bears the upstream pulley 134.

The boom 132 has a first end 138 jointed on the rotary base 130, around a substantially horizontal axis E-E' and a free end 140.

The second pulley 136 is rotatably mounted on the boom 132, advantageously in the vicinity of the free end 140.

Thus, during the rotation of the base 130 around the axis B-B' relatively to the barrel 32, the boom 132 may rotate around the axis B-B' together with the base 130.

The boom 132 is further pivotally mounted on the base 130 around the horizontal axis E-E' between a position brought closer to the tower axis B-B' illustrated in FIG. 9, and a position away from the tower axis B-B', illustrated in FIG. 10.

The line 137 may be deployed relatively to the winch, and is retractable on the winch. The line 137 is engaged on the pulleys 134, 136. It has downstream from the pulley 134, a vertical section 142 which may move down along the laying axis C-C' or parallel to the latter.

The line 137 is for example an abandonment and recovery cable, designated by the term of Abandonment and Recovery System or A&R System.

The operation of the laying device 18 during the deployment of a flexible pipe 12 in the expanse of water 11 will now be described.

Initially, the flexible pipe 12 is stored in the storage assembly 16 by being wound on the rotary member 28.

The pipe 12 thus has an adequate radius of curvature greater than its MBR.

The floating structure 10 is then moved on the expanse of water 11 as far as a laying region in which the pipe 12 should be deployed.

Figure 5:
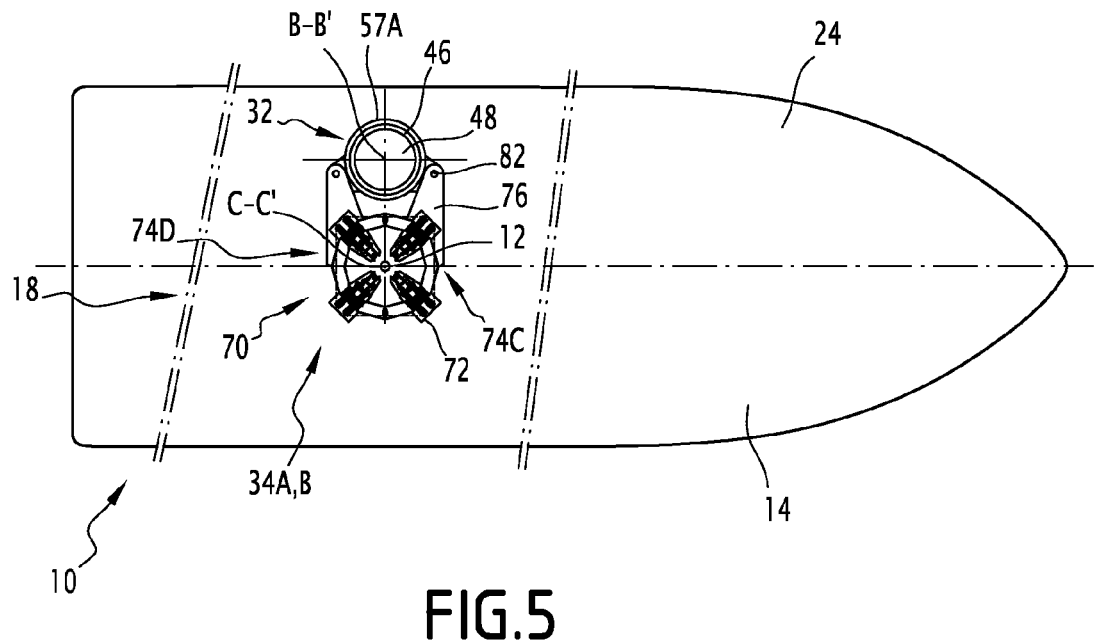
FIG. 5 is a partial top view of the laying structure illustrated in FIG. 1, in a first laying configuration.

In a first laying configuration, illustrated with FIG. 5, the pipe 12 is deployed through the central well 26. The sleeves 57A, 57B are then arranged angularly so that each chassis 70 in its closed configuration is placed facing the central well 26 with the laying axis C-C' passing through the central well 26.

For this purpose, if this is required, each sleeve 57A, 57B is driven into rotation around the axis B-B' relatively to the barrel 32.

Next, the respective chassis 70 of the gripping and moving assemblies 34A, 34B are at least partly opened.

An end of the pipe 12 is then gripped by an operating line 137 of the handling device 38 and brought into contact with the chute 112 by engaging it into the latter.

Next, a pipe section 12 is successively deployed on the chute 112 between the upper end 116 and the downstream end 118, and is then moved downwards between the opposite half-frames 74C, 74D of each chassis 70 so as to vertically extend along the axis C-C'.

Next, the chassis 70 have passed into their closed position. For this purpose, the half-frame 74C, 74D are displaced towards each other by pivoting them around the supports 58A, 58B, and are then optionally locked onto each other, as this was described above.

The mechanisms 96 for radial displacement of the caterpillar-tracks 90 are then actuated in order to apply each longitudinal portion 98A for guiding a caterpillar-track 90 against the outer peripheral surface of the pipe 12 along a generatrix of the latter.

The radial displacement mechanisms 96 are moreover driven in order to apply a predetermined pressure on the pipe 12.

And then, the device 94 for driving the rollers 92 into rotation is actuated. The caterpillar tracks 90 are then driven into motion, so that each longitudinal portion 98A moves from top to bottom while driving the pipe 12. The pipe 12 is thus driven into translation along the laying axis C-C' by the caterpillar-tracks 90 of the tensioners 72 facing each assembly 34A, 34B.

An increasing pipe 12 length may thus be deployed, with controlled tension, via the gripping and guiding assemblies 34A, 34B.

Moreover, by the robust structure of the tower 30 given by the single-block barrel 32, and by the attachment of this chassis 70 on the single-block barrel 32, the tower 30 retains the pipe 12 in a controlled way during its deployment, even when the deployed pipe 12 length is very large, for example of more than 1,000 meters.

In certain cases, a piece of equipment having a radial extent greater than that of the pipe 12 and/or greater than that of the passage 73 has to be moved down into the expanse of water 11 while being mounted on the pipe 12. Such a piece of equipment is for example a connector or an accessory. In this case, the handling device 38 is maneuvered in rotation in order to place the line 137 facing the laying axis C-C'.

The line 137 is then attached onto the piece of equipment and the upper end of the pipe 12 is mounted under the piece of equipment.

Next, the chassis 70 are opened in order to move the half-frames 74C, 74D from the laying axis C-C' and thereby clearing the passage for the piece of equipment to be moved down. The line 137 then bears the piece of equipment and the pipe 12.

The line 137 is then released so as to allow the moving down of the equipment into the expanse of water.

Next, when another pipe section 12 has to be moved down, the chassis 70 may be closed so as to allow the gripping of the pipe 12 between opposite tensioners 72.

When the pipe 12 is moved down by the assemblies 34A, 34B, as the handling device 18 includes a rotary base 130, it may be used independently of the downward movement of the pipe 12 in order to carry out tasks on areas of the floating structure 10 which are angularly shifted relatively to the laying axis C-C'.

Figure 6:
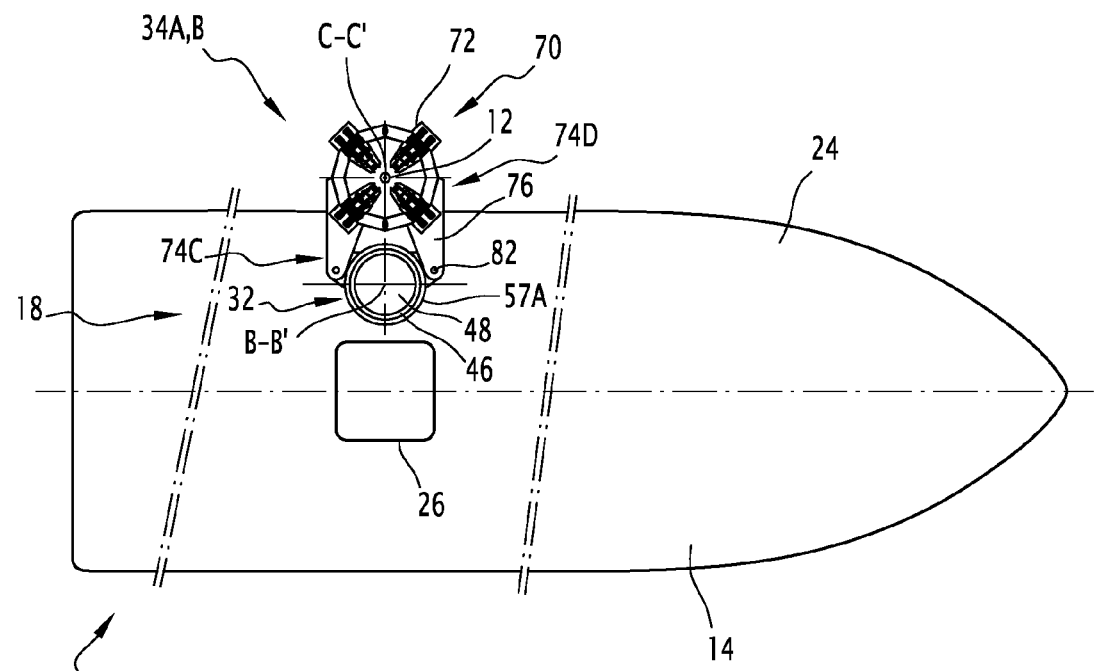
FIG. 6 is a view similar to FIG. 5, in a second laying configuration.

In a second laying configuration, illustrated by FIG. 6, the pipe 12 is moved down into the expanse of water 11 by having it pass above a side edge of the floating structure 10.

Each sleeve 57A, 57B is then pivoted around the axis B-B' for bringing each chassis 70 of a gripping and moving assembly 34A, 34B to facing the expanse of water, laterally away from the side edge of the structure 10. Thus, as illustrated in FIG. 6, the gripping 34A, 34B and guiding assemblies protrude beyond the side edge of the floating structure 10.

The guiding assembly 36 is moreover pivoted in order to ensure adequate deployment of the pipe 12 from the storage assembly 16 to the laying axis C-C'.

The laying axis C-C' is then located facing the expanse of water, beyond the side edge of the floating structure 10.

Next, the operations described earlier for lowering the pipe 12 are carried out similarly.

In one alternative, the laying device 18 is used for raising a flexible pipe 12 immersed in the expanse of water to the surface, and winding it up in a storage assembly 16 present in the ship.

In this case, the caterpillar-tracks 90 of the tensioners 72 are activated so that the longitudinal section 98A moves from bottom to top and allows traction of the pipe 12.

More generally, the possibility of angularly displacing the laying axis C-C' defined by each chassis 70 around the axis B-B' of the barrel 32 of tower 30 allows the laying device 18 to be placed in a large variety of configurations, notably for lowering the pipe through a central well 26, when this well is present, or alternatively for lowering the pipe 12 by having it pass above a side edge of the floating structure 10. It is further possible to pivot the barrel 32 around the axis B-B' in order to clear a working space on the upper deck 24 by displacing said or each assembly 34A, 34B angularly away from this working space.

Figure 11:
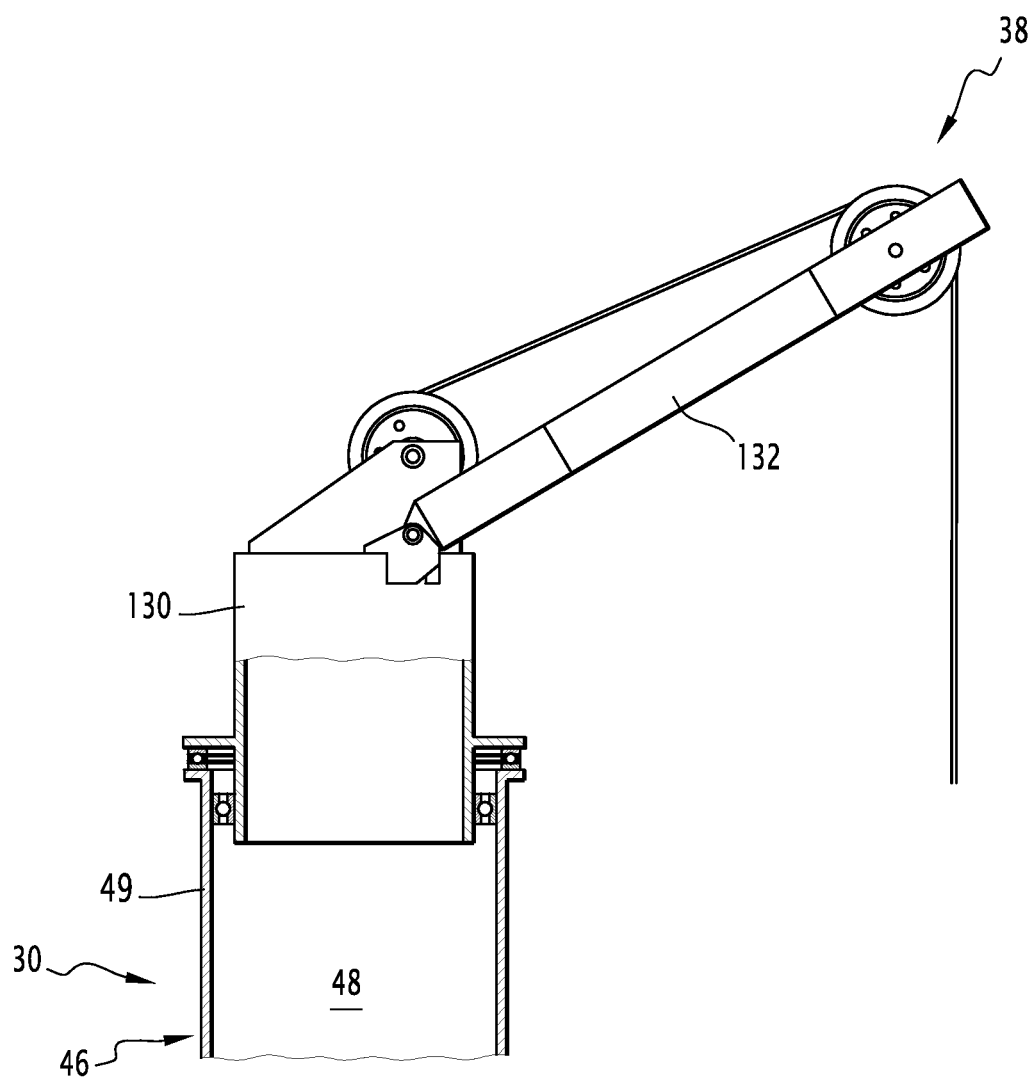
FIG. 11 is a schematic sectional view of the upper end of an alternative device according to the invention.

In an alternative schematically illustrated in FIG. 11, the handling device 38 is retractable. For this purpose, it is mounted by reversible engagement into the upper end of the barrel 32. Roller bearings ensuring rotation of the handling device 38 are interposed between the base 130 and the barrel 32.

The handling device 38 may thus be extracted from the upper end so as to be placed on the deck 34 and to thereby reduce the height of the tower 30 when this is required, for example in order to pass under a bridge.

Figure 12:
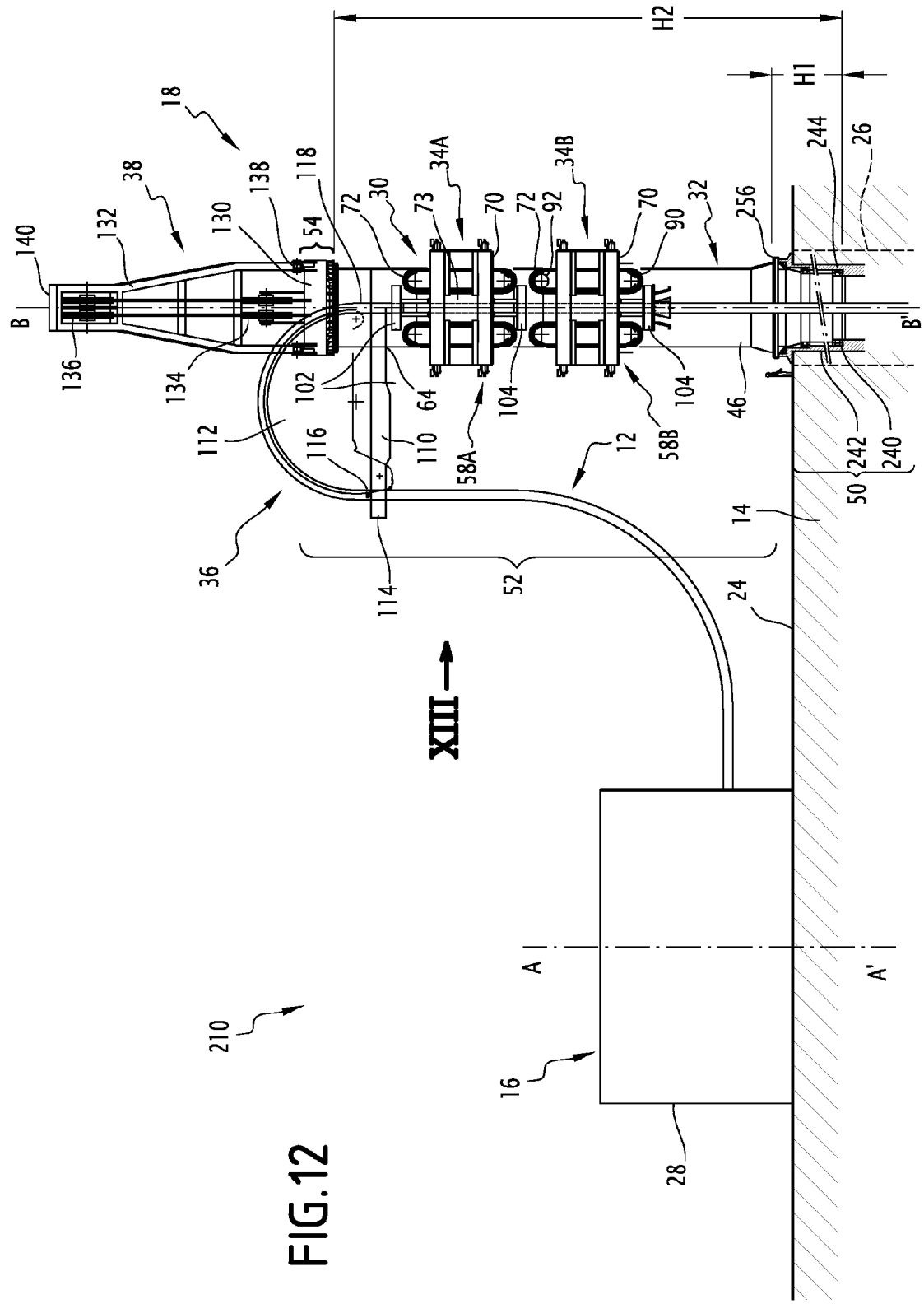
FIGS. 12 and 13 are views similar to FIGS. 1 and 2 of a second laying structure according to the invention.
Figure 13:
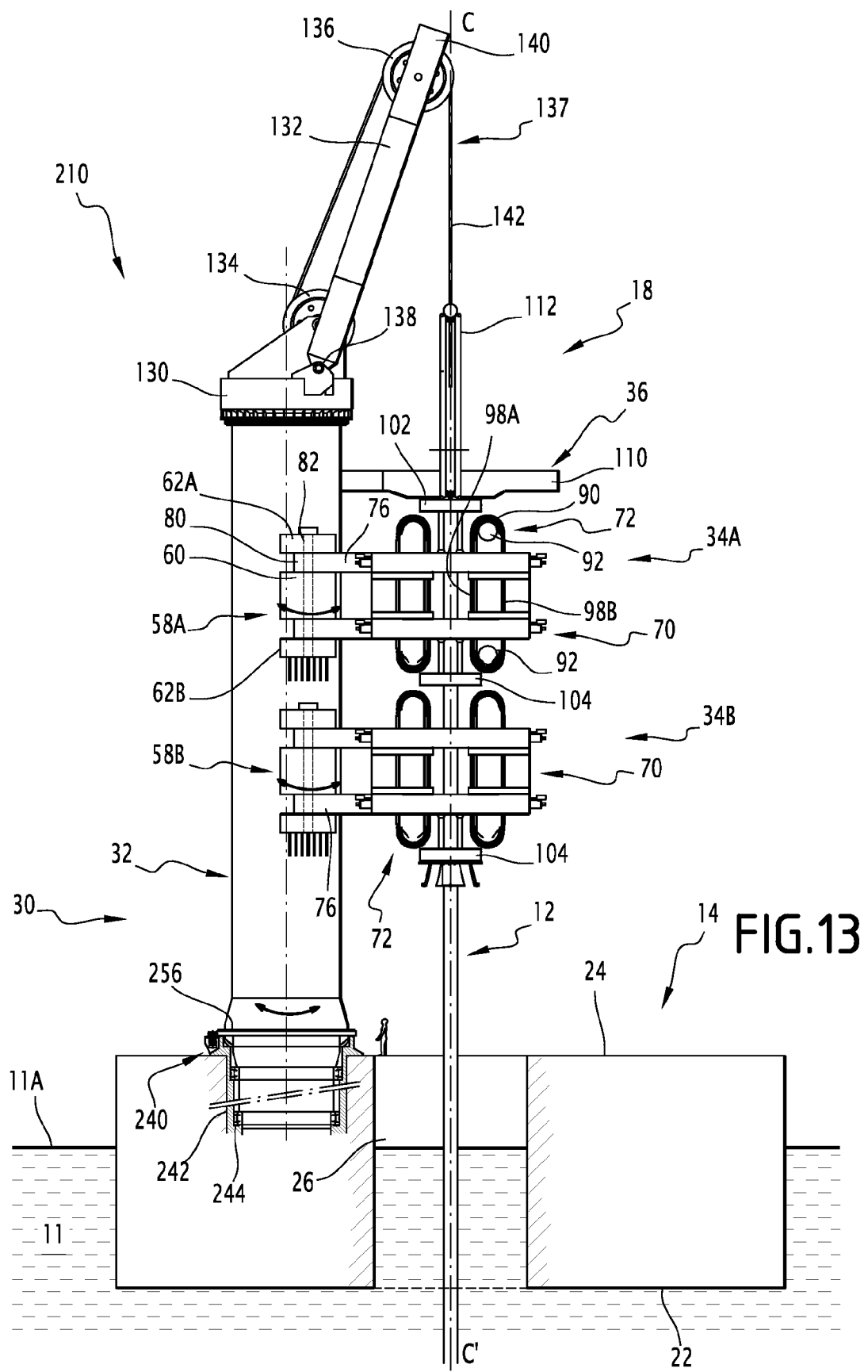

A second floating structure 210 according to the invention is illustrated by FIGS. 12 and 13.

In this structure 210, the barrel 32 of the tower 30 is positioned in a support 240 attached on the hull 14 in order to retain the barrel 32 and allow its guiding rotation around its axis B-B'.

The support 240 is for example formed by a cylindrical sleeve 242 inserted into the hull 14 through the upper deck 24 and welded in the hull 14. The support 240 includes a plurality of bearings 244 intended to be interposed between the sleeve 242 and the barrel 32 in order to allow rotation of the barrel 32 in the support 240.

The support 240 has a height H1, taken along the axis B-B', of less than the height H2 of the barrel 32, taken along the axis B-B'.

Alternatively, the support 240 is delimited in the hull 14.

In the example illustrated in FIGS. 12 and 13 the intermediate portion 52 has at its base, a supporting flange 256 intended to rest on the support 240 in order to block the barrel 32 in position along the axis B-B'.

In this example, the supports 58A, 58B are mounted so as to be secured to the barrel 32. The tower 30 is thus without any pivoting sleeves 57A, 57B.

Thus, the rotation of the gripping and moving assemblies 34A, 34B around the tower axis B-B' between the first laying configuration and the second laying configuration is ensured by the rotation of the barrel 32 around the support 240.

In this respect, in order to place each gripping and moving assembly 34A, 34B in the first laying configuration, the barrel 32 of the tower is pivoted so that each chassis 70 in its closed configuration is placed facing the central well 26, with the laying axis C-C' passing through the central well 26.

Also, in order to have each gripping and moving assembly 34A, 34B pass into the second laying configuration described above, the barrel 32 of the tower 30 is pivoted around the axis B-B' relatively to the support 240 in order to bring each chassis 70 to facing the expanse of water, laterally into the state of the side edge of the structure 10.

In an alternative of the latter device, the supports 58A, 58B are mounted on rotary sleeves 57A, 57B, like for the embodiments of FIGS. 1 and 2.

In another alternative of each of the devices 10, 210, the tower 30 may be used for lowering a rigid or semi-rigid pipe 12.

In this case, the assemblies 34A, 34B may comprise tensioners 72 as described earlier. Alternatively, at least one of the gripping or guiding assemblies 34A, 34B is mounted so as to be translationally moveable along the axis B-B' of the barrel 32.

In an embodiment, the assemblies 34A, 34B comprise retaining members forming clamping jaws or supporting blocks for gripping rigid pipe sections, as for example described in patent application WO 99/35429 of the Applicant.

What is claimed is:

1. A device for laying a pipe in an expanse of water, comprising:
    a tower intended to protrude along a tower axis in a floating laying structure;
    at least one assembly for gripping and moving the pipe intended to come into contact with a peripheral surface of the pipe in order to guide the displacement of the pipe towards the expanse of water along a laying axis substantially parallel to the tower axis, said at least one gripping and moving assembly being borne by the tower;
    wherein the tower is formed by a barrel extending along the tower axis, said at least one gripping and moving assembly transversally protruding from the barrel relative to the tower axis; and
    wherein said barrel is tubular, hollow and has a circular cross-section in at least a portion thereof.

2. The device according to claim 1, wherein the barrel includes a single attachment leg in the floating structure.

3. The device according to claim 1, wherein said at least one gripping and moving assembly is angularly displaceable around the tower axis between a first laying configuration and a second laying configuration.

4. The device according to claim 3, wherein said at least one gripping and moving assembly is rotatably mounted relative to the barrel in order to displace said at least one gripping and moving assembly between its first laying configuration and its second laying configuration.

5. The device according to claim 1, further comprising a chute for guiding the pipe towards said at least one gripping and moving assembly, the guiding chute being borne by the tower, while being positioned above said at least one gripping and moving assembly.

6. The device according to claim 1, further comprising a distinct handling device of said at least one gripping and moving assembly, the handling device being borne by the tower.

7. The device according to claim 6, wherein the handling device is mounted at an upper end of the barrel.

8. The device according to claim 6, wherein the handling device comprises a winch and a line deployable from the winch, the deployable line being able to bear the pipe.

9. The device according to claim 1, wherein said at least one gripping and moving assembly includes a chassis defining a passage for circulation of the pipe along a laying axis parallel to the tower axis, and at least one mechanism for gripping a peripheral surface of the pipe, the gripping mechanism being borne by the chassis.

10. The device according to claim 9, wherein the chassis is displaceable between a closed laying configuration and an open configuration for accessing the circulation passage, the chassis comprising two opposite supporting structures, each supporting structure bearing a gripping mechanism intended to come into contact with the pipe, at least one supporting structure being rotatably mounted relative to the barrel in order to have the chassis pass from its closed configuration to its open configuration.

11. The device according to claim 9, wherein the gripping mechanism comprises a tensioner with caterpillar-type tracks.

12. The device according to claim 10, wherein both said supporting structures are rotatably mounted relative to the barrel in order to have the chassis pass from its closed configuration to its open configuration.

13. The device according to claim 1, wherein said portion of the barrel is substantially cylindrical and has a substantially solid peripheral surface.

14. The device according to claim 13, wherein more than 90% of the outer surface of the barrel is enclosed by the substantially solid peripheral surface.

15. A device for laying a pipe in an expanse of water, comprising:
    a tower intended to protrude along a tower axis in a floating laying structure;
    at least one assembly for gripping and moving the pipe intended to come into contact with a peripheral surface of the pipe in order to guide the displacement of the pipe towards the expanse of water along a laying axis substantially parallel to the tower axis, said at least one gripping and moving assembly being borne by the tower;
    wherein the tower is formed by a barrel extending along the tower axis, said at least one gripping and moving assembly transversally protruding from the barrel relative to the tower axis; and wherein said at least one gripping and moving assembly is angularly displaceable around the tower axis between a first laying configuration and a second laying configuration;

further comprising a support intended to be attached on the floating laying structure, the barrel being rotatably mounted in the support around the tower axis in order to move said at least one gripping and moving assembly between its first laying configuration and its second laying configuration.

16. A device for laying a pipe in an expanse of water, comprising:

a tower intended to protrude along a tower axis in a floating laying structure;

at least one assembly for gripping and moving the pipe intended to come into contact with a peripheral surface of the pipe in order to guide the displacement of the pipe towards the expanse of water along a laying axis substantially parallel to the tower axis, said at least one gripping and moving assembly being borne by the tower;

wherein the tower is formed by a barrel extending along the tower axis, said at least one gripping and moving assembly transversally protruding from the barrel relative to the tower axis; and wherein said barrel is tubular, hollow and has a circular cross-section in at least a portion thereof;

further comprising a distinct handling device of said at least one gripping and moving assembly, the handling device being borne by the tower;

wherein the handling device is rotatably mounted relative to the barrel.

17. The device according to claim 16, wherein said portion of the barrel is substantially cylindrical and has a substantially solid peripheral surface.

18. The device according to claim 17, wherein more than 90% of the outer surface of the barrel is enclosed by the substantially solid peripheral surface.

19. A floating laying structure, intended for laying a pipe in an expanse of water, comprising:

a deck;

a laying device comprising a tower intended to protrude along a tower axis; and at least one assembly for gripping and moving the pipe intended to come into contact with a peripheral surface of the pipe in order to guide the displacement of the pipe towards the expanse of water along a laying axis substantially parallel to the tower axis, said at least one gripping and moving assembly being borne by the tower;

wherein the tower is formed by a barrel extending along the tower axis, said at least one gripping and moving assembly transversally protruding from the barrel relative to the tower axis;

the laying device protruding on the deck, said at least one gripping and moving assembly being moveable relative to the deck between a first laying configuration, in which the laying axis is placed facing the deck, and a second laying configuration in which the laying axis is located outside the deck.

20. The structure according to claim 19, bearing a pipe engaged into said at least one gripping and moving assembly.

21. The structure according to claim 19, further comprising a hull floating on the expanse of water, the barrel being fixedly mounted in rotation in the hull, by fitting it in or by being placed on a support attached on the hull in order to retain the barrel and allow its guiding in rotation around its axis.

22. The structure according to claim 19, wherein in the first laying configuration, the laying axis is placed facing a central well of the floating laying structure.

23. The structure according to claim 20, wherein said pipe is a flexible pipe.

24. A method for laying a pipe in an expanse of water, the method comprising the following steps:

positioning a structure according to claim 14 at the surface of the expanse of water facing a region for laying the pipe;

placing said at least one assembly for gripping and moving the pipe in a laying configuration;

engaging at least one section of the pipe to be laid into said or each gripping and moving assembly;

vertically displacing the pipe with the gripping and moving assembly in order to deploy the pipe in the expanse of water.

* * * * *